(12) United States Patent
Abdollahi

(10) Patent No.: US 8,982,595 B2
(45) Date of Patent: Mar. 17, 2015

(54) T-CONNECTED AUTOTRANSFORMER-BASED 40-PULSE AC-DC CONVERTER FOR POWER QUALITY IMPROVEMENT

(71) Applicant: Rohollah Abdollahi, Qom (IR)

(72) Inventor: Rohollah Abdollahi, Qom (IR)

( * ) Notice: Subject to any disclaimer, the term of this patent is extended or adjusted under 35 U.S.C. 154(b) by 214 days.

(21) Appl. No.: 13/761,146

(22) Filed: Feb. 6, 2013

(65) Prior Publication Data

US 2014/0218982 A1   Aug. 7, 2014

(51) Int. Cl.
*H02M 5/06* (2006.01)
*H02M 7/08* (2006.01)
*H02M 1/42* (2007.01)

(52) U.S. Cl.
CPC ............. *H02M 7/08* (2013.01); *H02M 1/4208* (2013.01)
USPC ............................ 363/154; 363/126; 318/705

(58) Field of Classification Search
USPC ......... 363/34–41, 64, 98, 126, 129, 148, 154, 363/155; 318/432–433, 671, 673, 685, 696
See application file for complete search history.

(56) References Cited

U.S. PATENT DOCUMENTS

| | | | | |
|---|---|---|---|---|
| 4,876,634 A * | 10/1989 | Paice | ................................ | 363/5 |
| 5,138,544 A * | 8/1992 | Jessee | ............................. | 363/43 |
| 5,781,428 A * | 7/1998 | Paice | ............................ | 363/126 |
| 6,316,902 B1 * | 11/2001 | Kitamura | ...................... | 318/671 |
| 8,064,227 B2 * | 11/2011 | Namuduri et al. | ............... | 363/17 |

* cited by examiner

*Primary Examiner* — Rajnikant Patel
(74) *Attorney, Agent, or Firm* — Azadeh Saidi

(57) ABSTRACT

Design of a T-connected autotransformer based 20-pulse ac-dc converter is presented in this invention. The 20-pulse topology is obtained via two paralleled ten-pulse ac-dc converters each of them consisting of a five-phase (five-leg) diode bridge rectifier. For independent operation of paralleled diode-bridge rectifiers, a zero sequence blocking transformer (ZSBT) is designed and implemented. Connection of a tapped inter-phase transformer (IPT) at the output of ZSBT results in doubling the number of output voltage pulses to 40. Experimental results are obtained using the designed and constructed laboratory prototype of the proposed converter to validate the design procedure and the simulation results under varying loads. The VA rating of the magnetic in the proposed topology are calculated to confirm the savings in space, volume, weight, and cost of the proposed configuration.

11 Claims, 12 Drawing Sheets

Figure 1:
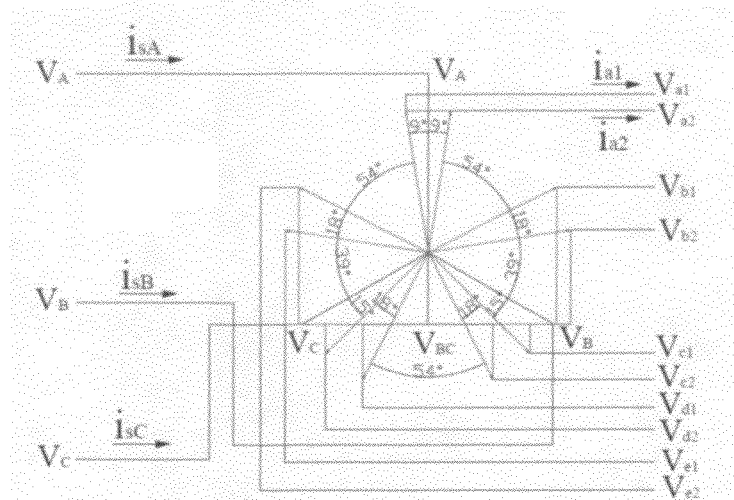

T-CONNECTED AUTOTRANSFORMER-BASED 40-PULSE AC-DC CONVERTER FOR POWER QUALITY IMPROVEMENT

FIELD OF THE INVENTION

The present invention relates to Design of a T-connected autotransformer based 40-pulse ac-dc converter, which can be used for harmonic reduction in different applications such as adjustable speed AC or DC motor drives.

BACKGROUND OF THE INVENTION

Recent advances in solid state conversion technology has led to the proliferation of variable frequency induction motor drives (VFIMD's) that are used in various applications such as air conditioning, blowers, fans, pumps for waste water treatment plants, textile mills, rolling mills etc.

As a practical technique, direct torque control (DTC) strategy is implemented in induction motor drives (DTCIMDs), serving various applications. These drives utilize voltage source inverters which are fed from conventional six-pulse diode bridge rectifiers. The most important drawback of these rectifiers is their poor power quality injection of harmonic currents into ac mains. The circulation of current harmonics into the source impedance yields in harmonically polluted voltages at the point of common coupling (PCC) and consequently resulting in undesired supply voltage conditions for the nearby costumers. The value of current harmonic components which are injected into the grid by nonlinear loads should be controlled within the standard limits.

The most prominent standards in this field are IEEE standard 519 and the International Electro-technical Commission (IEC) standard. For DTCIMDs one effective solution to eliminate harmonics is the use of multipulse AC-DC converters. According to the recent investigations, these converters are based on either phase multiplication, phase shifting, pulse doubling or a combined solution (have been reported in U.S. Pat. No. 7,274,280). Application of multi-pulse technique (up to 18-pulse) in AC-DC converters are reported in U.S. Pat. No. 7,375,996 where line current THD of more than 5% is experienced under different load conditions.

The polygon-connected autotransformer based 30-pulse (U.S. Pat. No. 7,719,858) was designed for AC-DC power converter. The DC link voltage in this topology is higher than that of a 6-pulse diode bridge rectifier, thus making the scheme non-applicable for retrofit applications. However, the polygon-connected autotransformer based configurations, make use of three single-phase transformers while the T-connected autotransformer topology employs only two single-phase transformers, resulting in reduced space, volume, weight, and, finally, cost of the drive (U.S. Pat. No. 7,375, 996).

In this invention, design of a T-connected autotransformer based 20-pulse AC-DC converter is proposed. In the proposed structure, two five-leg diode-bridge rectifiers are paralleled via a Zero Sequence Blocking Transformer (ZSBT) resulting in a 20-pulse output voltage. In order to double the number of pulses up to 40, a Tapped Inter-Phase Transformer (IPT) with two additional diodes are added at the rectifier outputs. The proposed converters are modeled and simulated using MATLAB to study its behavior and specifically to analyze the power quality indices at ac mains. Finally, a small-rating laboratory prototype of the proposed 40-pulse converter is constructed in order to verify the simulation results and examine the effectiveness of the proposed topology.

OBJECT AND SUMMARY OF THE INVENTION

Proposed 20-Pulse AC-DC Converter

It is known that a 12-pulse rectified voltage can be made with two paralleled six-pulse three-phase (three-leg) diode-bridge rectifiers. The phase shift between the two supplying voltages should be 30 degrees. Similarly, in order to implement a 20-pulse ac-dc converter, two paralleled 10-pulse bridge rectifiers (two five-leg rectifiers) are required. In this case two sets of five-phase voltages with a phase difference of 72 degrees between the voltages of each group and 18 degrees difference between the same voltages of the two groups are needed. For this purpose, a T-connected autotransformer is designed to produce the five phase voltages. The phasor diagram of the proposed T-connected autotransformer having two sets of 5-phase voltages with the required angular displacement is illustrated in FIG. 1.

Design of the Proposed Autotransformer for 20-Pulse AC-DC Converter

The aforementioned two voltage sets as $V_{a1}, V_{b1}, V_{c1}, V_{d1}, V_{e1}$, and $V_{a2}, V_{b2}, V_{c2}, V_{d2}, V_{e2}$ are fed to rectifiers I and II, respectively. The same voltages of the two groups, i.e. $V_{a1}$ and $V_{a2}$, are displaced by 18 degrees. $V_{a1}$ and $V_{a2}$ having a phase shift of +9 and -9 degrees from the input voltage of phase A ($V_a$), respectively.

Figure 2:
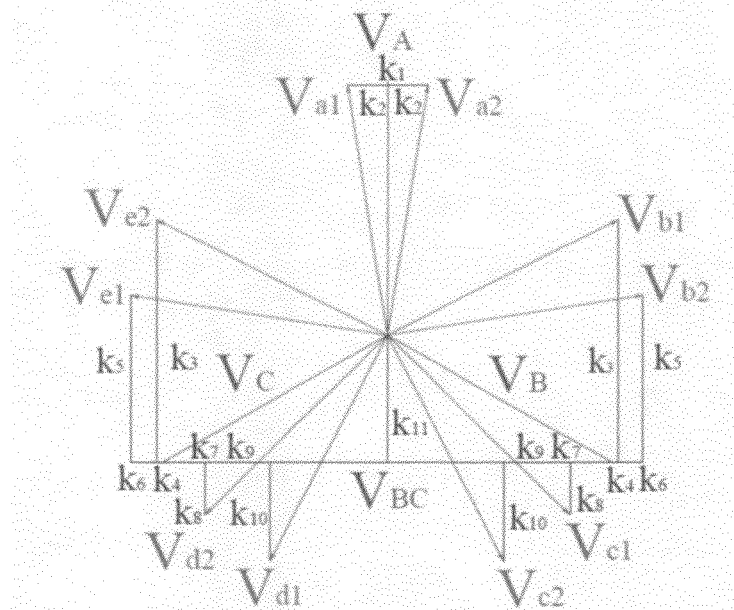

The five-phase voltages can be made from ac mains phase and line voltages with fractions of the primary winding turns. This is illustrated in FIG. 2 with 11 constants as $k_1$-$k_{11}$ representing the desired turn ratios corresponding to each winding fraction. Derivations of these constants are given by the following relationships.

$$V_A = V_s\angle 0°, V_B = V_s\angle -120°, V_C = V_s\angle 120°. \quad (1)$$

Where $V_s$ is the source phase voltage, $V_A$, $V_B$, and $V_C$ are three-phase primary winding voltages. The two sets of five-phase voltages with their phase shifts are given as:

$$V_{a1}=V_S\angle 9°,\ V_{b1}=V_S\angle -63°,\ V_{c1}=V_S\angle 135°,$$
$$V_{d1}=V_S\angle 153°,\ V_{e1}=V_S\angle 81° \quad (2)$$

$$V_{a2}=V_S\angle -9°,\ V_{b2}=V_S\angle -81°,\ V_{c2}=V_S\angle -153°,$$
$$V_{d2}=V_S\angle 135°,\ V_{e2}=V_S\angle 63° \quad (3)$$

Using the connection arrangement of the T-connected autotransformer shown in FIG. 2. the input voltages for converters I and II are given by (4) and (5) as:

$$V_{a1}=V_A-k_1 V_A-k_2 V_{BC}$$
$$V_{b1}=V_B+k_3 V_A+k_4 V_{BC}$$
$$V_{c1}=V_B-k_7 V_{BC}-k_8 V_A$$
$$V_{d1}=V_C+k_9 V_{BC}-k_{10} V_A$$
$$V_{e1}=V_C+k_5 V_A-k_6 V_{BC} \quad (4)$$
$$V_{a2}=V_A-k_1 V_A+k_2 V_{BC}$$
$$V_{b2}=V_B+k_5 V_A+k_6 V_{BC}$$
$$V_{c2}=V_B-k_9 V_{BC}-k_{10} V_A$$
$$V_{d2}=V_C+k_7 V_{BC}-k_8 V_A$$
$$V_{e2}=V_C+k_3 V_A-k_4 V_{BC} \quad (5)$$

where the line voltages are given as:

$$V_{AB}=\sqrt{3}V_A\angle 30°, V_{BC}=\sqrt{3}V_B\angle 30°, V_{CA}=\sqrt{3}V_C\angle 30°. \quad (6)$$

Constants $k_1$-$k_{11}$ are calculated based on (2)-(6) to obtain the required windings turn numbers to achieve the desired phase shift for the two voltage sets as:

$$k_1=0.0123, k_2=0.0903, k_3=0.9539, k_4=0.01443,$$
$$k_5=0.6564, k_6=0.0702, k_7=0.0917, K_8=0.2071,$$
$$k_9=0.2378, k_{10}=0.3910, k_{11}=0.5. \quad (7)$$

Figure 3:
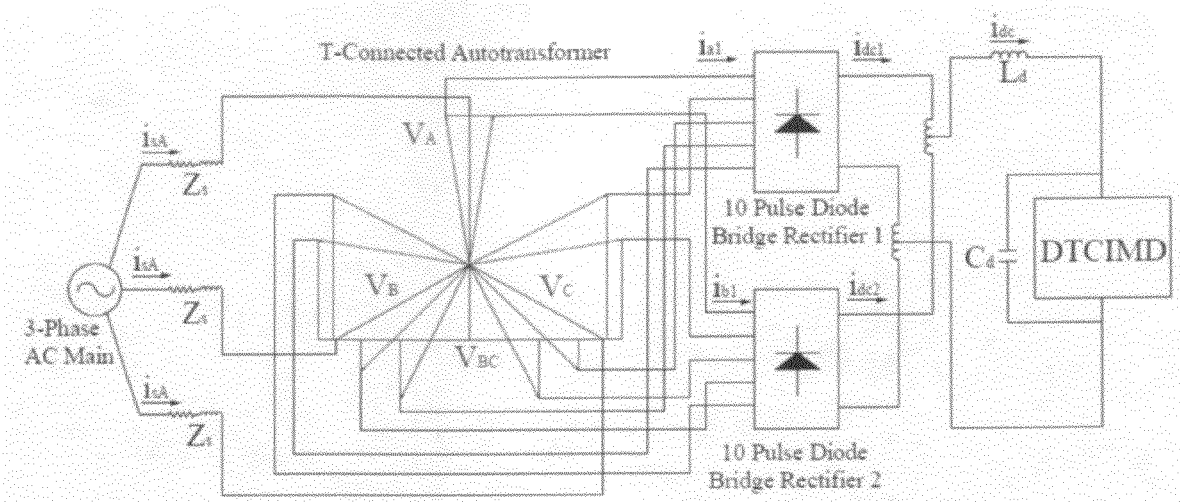

An overall schematic of the proposed 20-pulse ac-dc converter is shown in FIG. 3.

Figure 4:
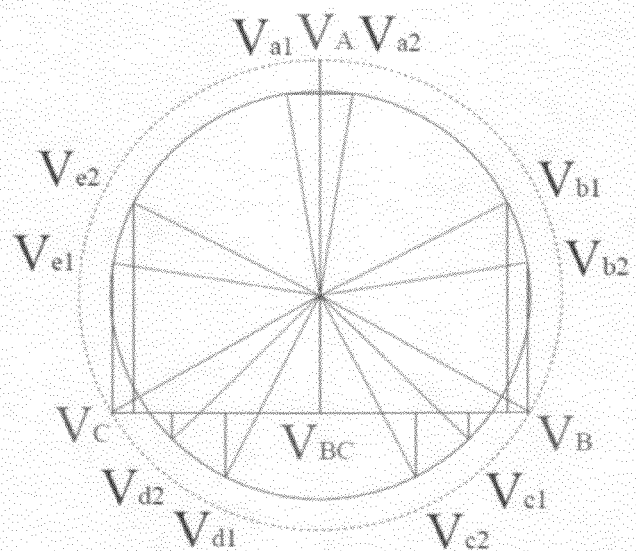

Design of Autotransformer for Retrofit Applications:

The value of output voltage in multipulse rectifiers boosts relative to the output voltage of a six-pulse converter making the multipulse rectifier inappropriate for retrofit applications. For instance, with the autotransformer arrangement of the proposed 20-pulse converter, the rectified output voltage is 13% higher than that of six-pulse rectifier. For retrofit applications, the above design procedure is modified so that the dc-link voltage becomes equal to that of six-pulse rectifier. This will be accomplished via modifications in the tapping positions of the windings as shown in FIG. 4. It should be noted that with this approach, the desired phase shift is still unchanged. Similar to section II part A, the following equations can be derived as:

$$|V_S|=0.87|V_A| \quad (8)$$

$$V_{a1}=V_A-k_1V_A-k_2V_{BC}$$
$$V_{b1}=V_B+k_3V_A-k_4V_{BC}$$
$$V_{c1}=V_B-k_7V_{BC}-k_8V_A$$
$$V_{d1}=V_C+k_9V_{BC}-k_{10}V_A$$
$$V_{e1}=V_C+k_5V_A+k_6V_{BC} \quad (9)$$
$$V_{a2}=V_A-k_1V_A+k_2V_{BC}$$
$$V_{b2}=V_B+k_5V_A-k_6V_{BC}$$
$$V_{c2}=V_B-k_9V_{BC}-k_{10}V_A$$
$$V_{d2}=V_C+k_7V_{BC}-k_8V_A$$
$$V_{e2}=V_C+k_3V_A+k_4V_{BC} \quad (10)$$

Accordingly, the values of constants $k_1$-$k_{11}$ are recalculated for retrofit applications as:

$$k_1=0.1428, k_2=0.0783, k_3=0.8940, k_4=0.0535,$$
$$k_5=0.6357, k_6=0.005, k_7=0.1457, k_8=0.1136,$$
$$k_9=0.2725, k_{10}=0.2733, k_{11}=0.5. \quad (11)$$

These values establish the essential turn numbers of the autotransformer windings to have the required output voltages and phase shifts for retrofit applications.

Figure 5:
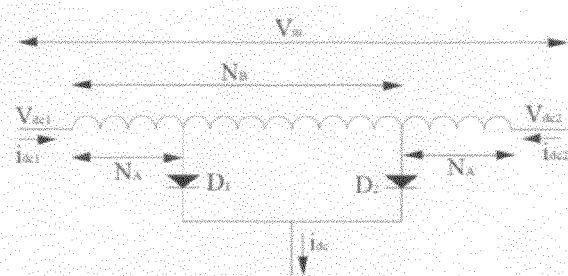

Interphase Transformer:

Pulse doubling can be achieved using a tapped inter-phase transformer (IPT) along with two additional diodes as shown in FIG. 5.

Figure 6:
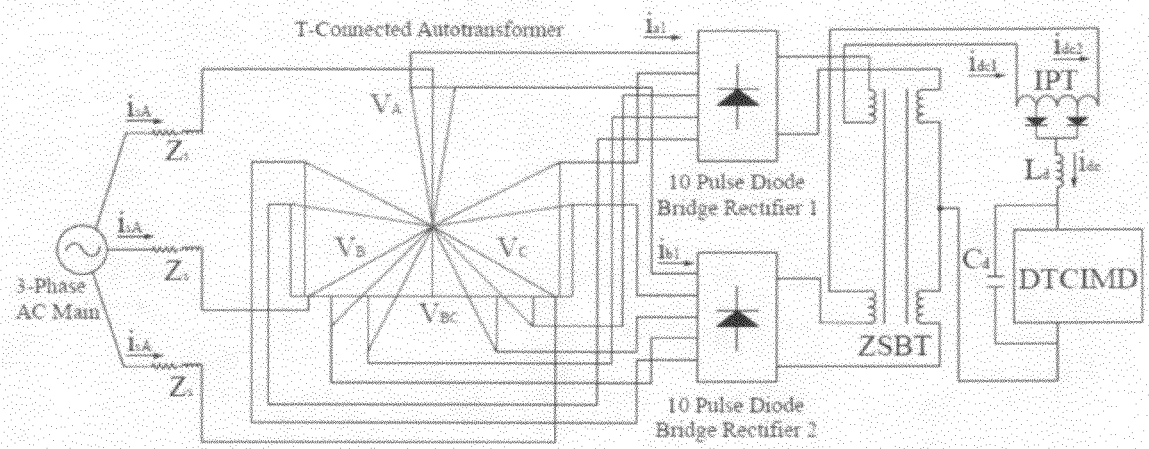

Likewise, a tapped IPT, as shown in FIG. 6, is used in this work to extract a 40-pulse current from the designed 20-pulse converter described in Section A. For the pulse multiplication process, it is necessary to ensure that the average output voltages of bridges are equal and phase shifted by 18 degrees.

As two 10-pulse rectifiers are paralleled, the voltage across the tapped IPT, $V_m$, has a frequency 10 times that of the supply. Therefore, the size, weight and volume of the tapped IPT will be reduced relative to rectifiers with a less pulse number. $V_m$ is an alternating voltage with both positive and negative half cycles. Hence, $D_1$ conducts when $V_m$ is positive and, on the other hand, $D_2$ conducts when $V_m$ is negative.

The MMF equivalence between the windings when $D_1$ is on can be given as:

$$i_{dc1}N_A=i_{dc2}N_B \quad (12)$$

where, $N_A$ and $N_B$ are number of turns as shown in FIG. 5. Output current of each rectifier is:

$$i_{dc1}+i_{dc2}=i_{dc} \quad (13)$$

Using (12) and (13), output current of the two rectifiers are calculated as follows:

$$i_{dc1}=(0.5+K_t)i_{dc}$$
$$i_{dc2}=(0.5-K_t)i_{dc} \quad (14)$$

In the above equation, $K_t=(N_B-0.5N_t)/N_t$ with $N_t=N_A+N_B$. The same relations can be written when $V_m$, is in its negative half cycle. Therefore, according to MMF equation, the magnitude of the output currents changes which results in pulse multiplication in the supply current. it is proved that $K_t$, should be equal to 0.2457 to eliminate the harmonic currents up to the 37th order which can be applied in this application too.

Zero Sequence Blocking Transformer:

In parallel-rectifier configurations, the two converters cannot be directly paralleled, as the output voltages are phase-shifted, and unwanted conduction sequence of diodes is probable. Therefore, a ZSBT is required to ensure the independent operation of two paralleled rectifiers. In the proposed 40-pulse converter, the voltage frequency of ZSBT is five times of the supply frequency and it shows high impedance at zero sequence (and its multiples) harmonic currents and prevents them to flow. Furthermore, high ripple frequency of the ZSBT voltage makes it small and light. An overall schematic of the proposed 40-pulse ac-dc converter is illustrated in FIG. 6.

BRIEF DESCRIPTION OF THE ACCOMPANYING DRAWINGS

FIG. 1. Shows the proposed autotransformer winding arrangement having T connection.

FIG. 2. Shows the T connection of proposed autotransformer for 20-pulse converter.

FIG. 3. Shows the T-autotransformer configuration for 20-pulse ac-dc conversion.

FIG. 4. Shows the Phasor diagram of voltages in the proposed autotransformer connection alongwith modifications for retrofit arrangement.

FIG. 5. Shows the Tapped Inter-phase Transformer (IPT) circuit for pulse-doubling in 20-pulse converters FIG. 6. Shows the T connected autotransformer configuration for 40-pulse ac-dc conversion.

Figure 7:
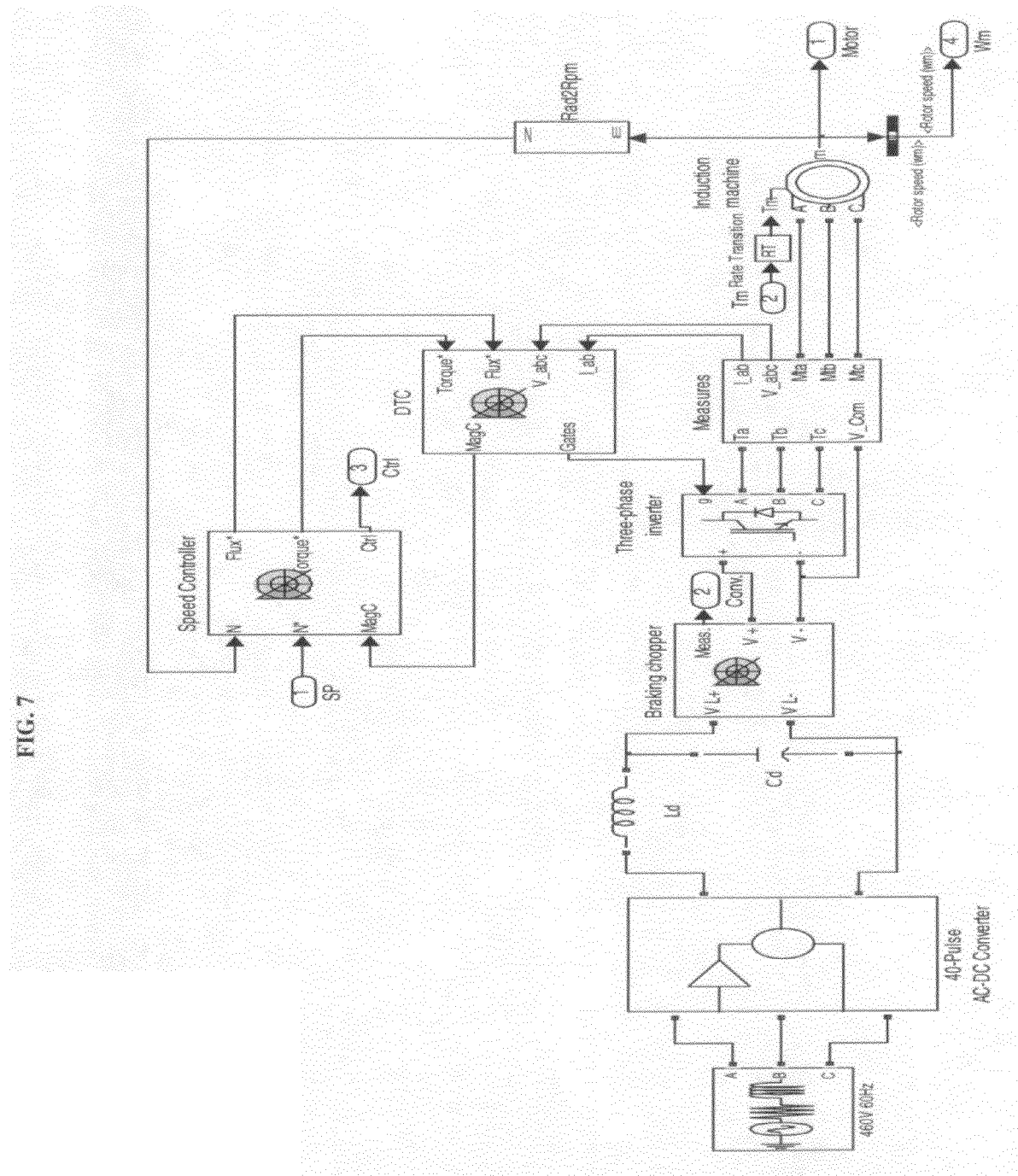

FIG. 7. Shows the Matlab model of 40-pulse ac-dc converter fed DTCIMD.

Figure 8:
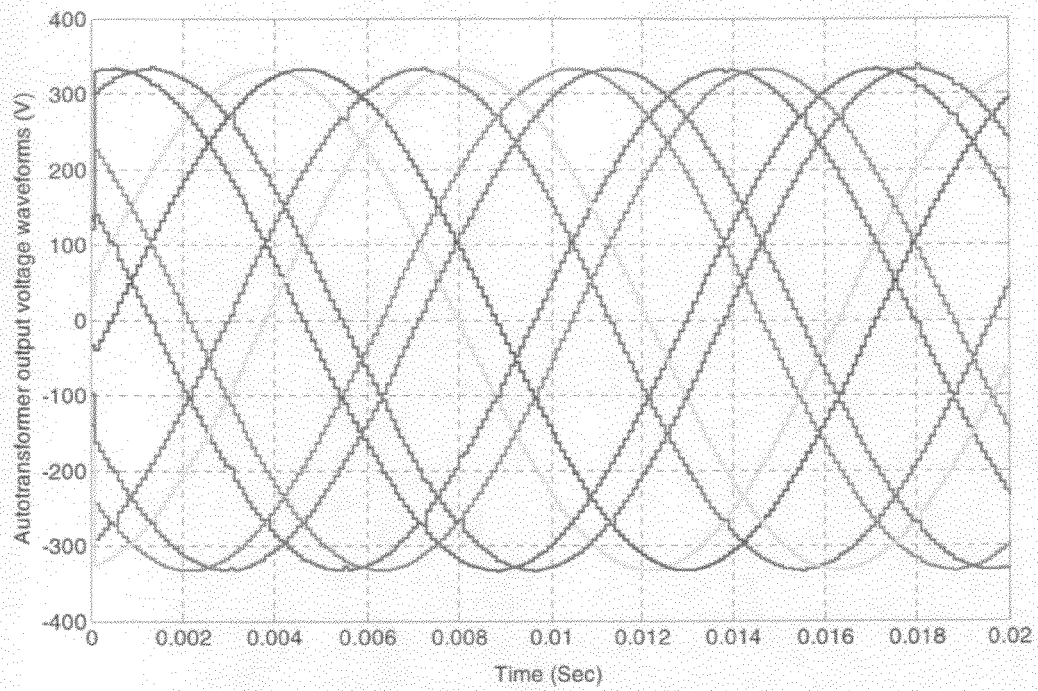

FIG. 8. Shows the Ten-phase autotransformer output voltage waveforms.

Figure 9:
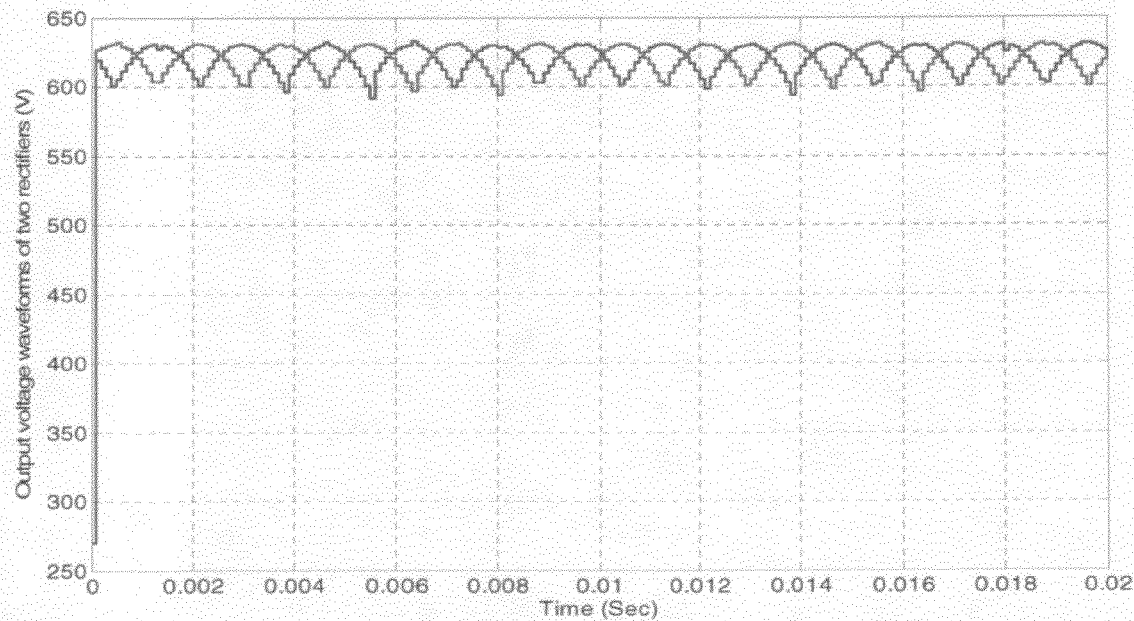

FIG. 9. Shows the output voltage waveforms of the two parallel 10-pulse rectifiers.

Figure 10:
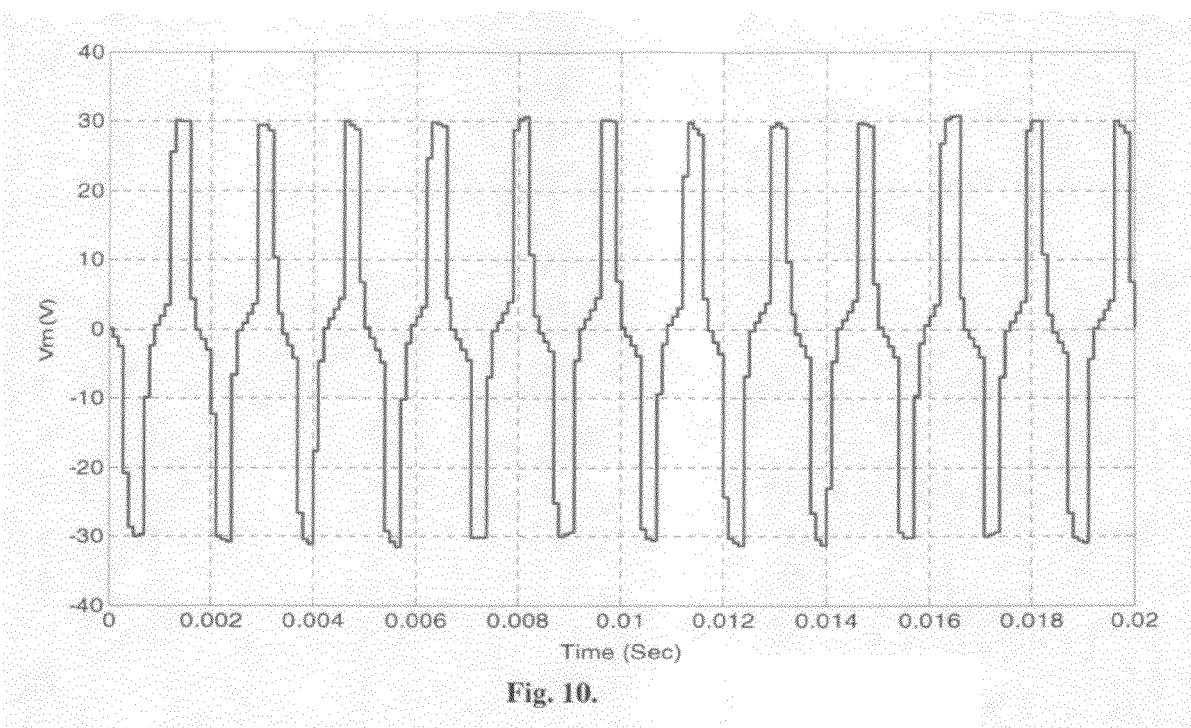

FIG. 10. Shows the Voltage waveform across the tapped IPT.

Figure 11:
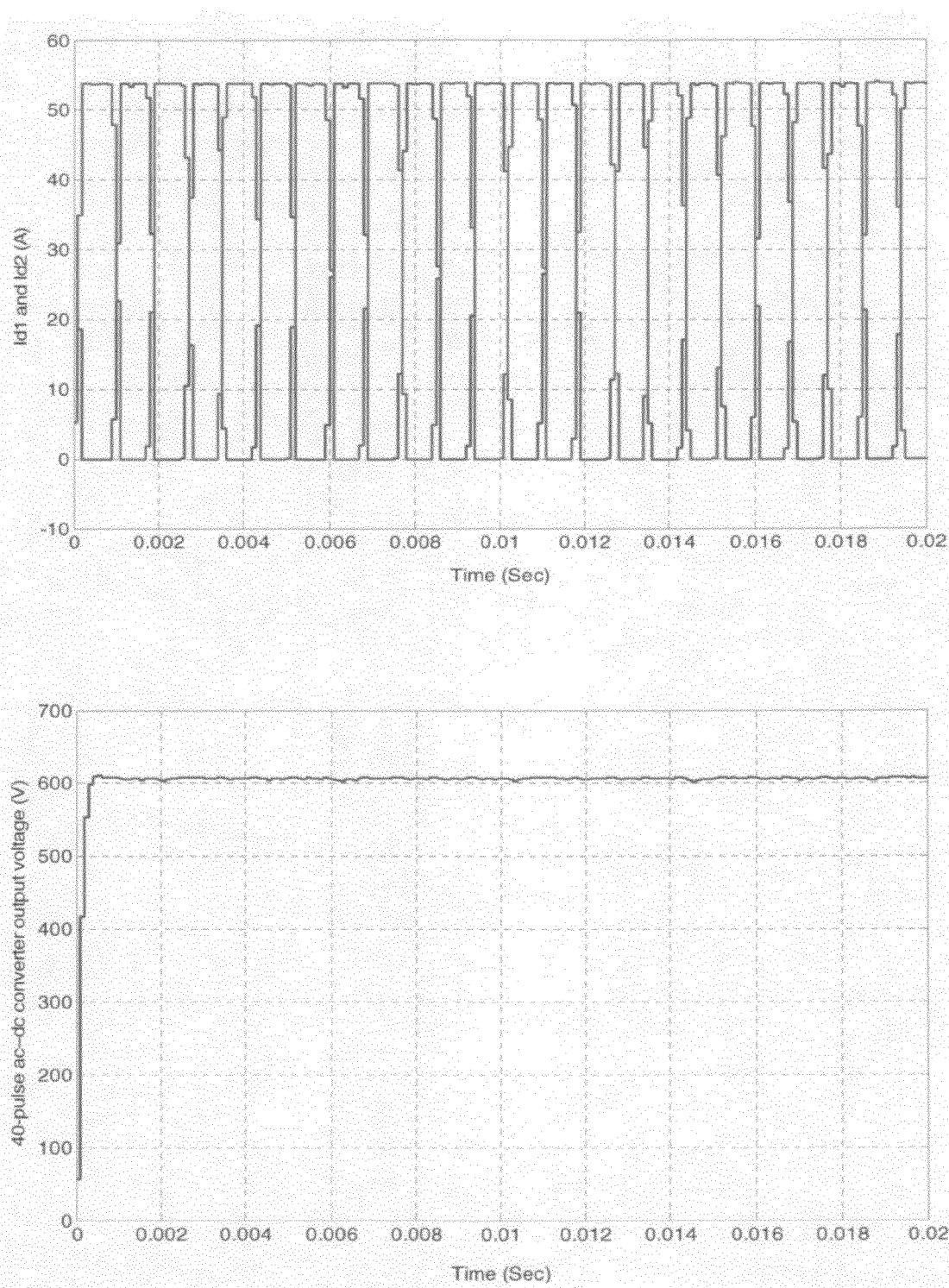

FIG. 11. Shows the Diodes $D_1$ and $D_2$ current waveforms.

Figure 12:
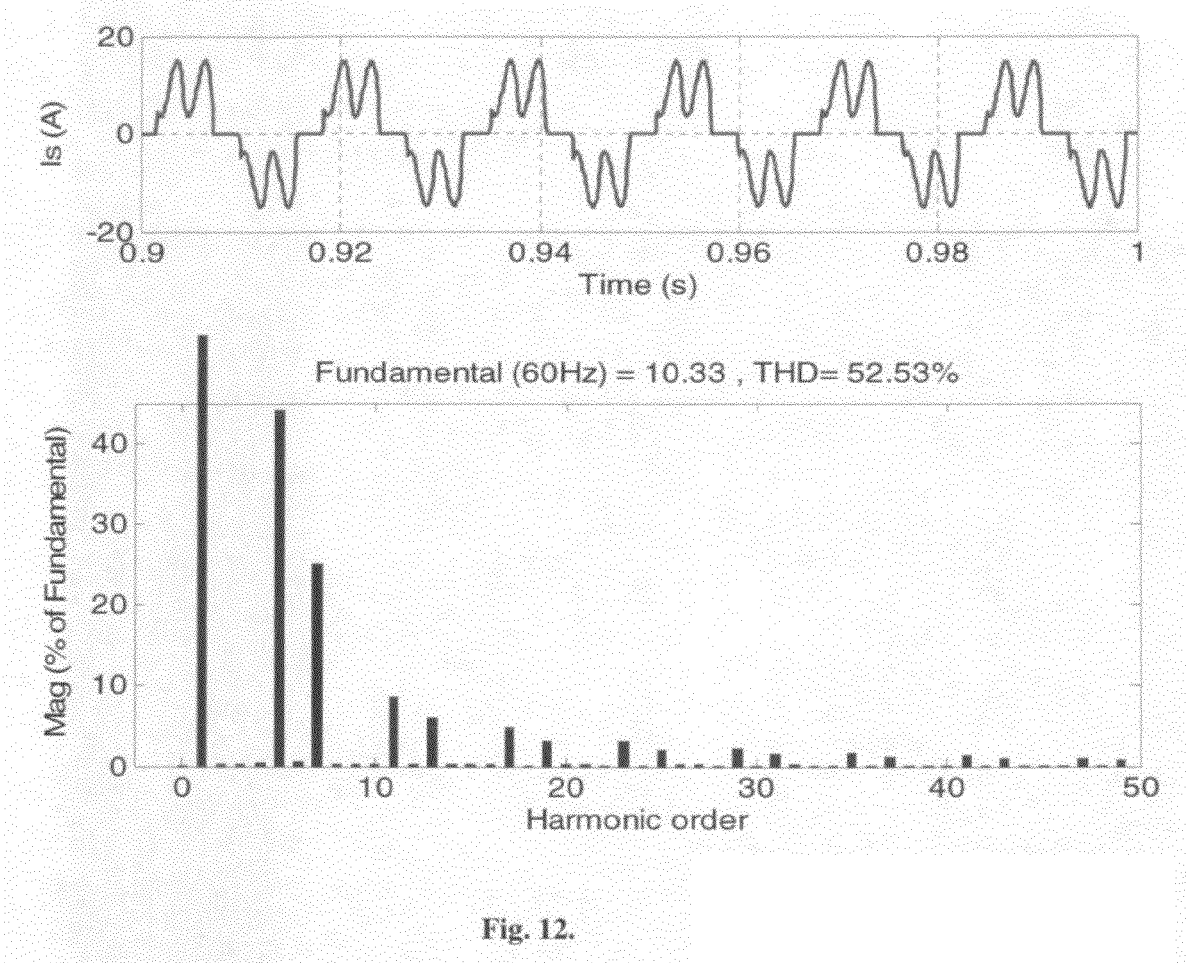

FIG. 12. shows the 40-pulse ac-dc converter output voltage.

Figure 13:
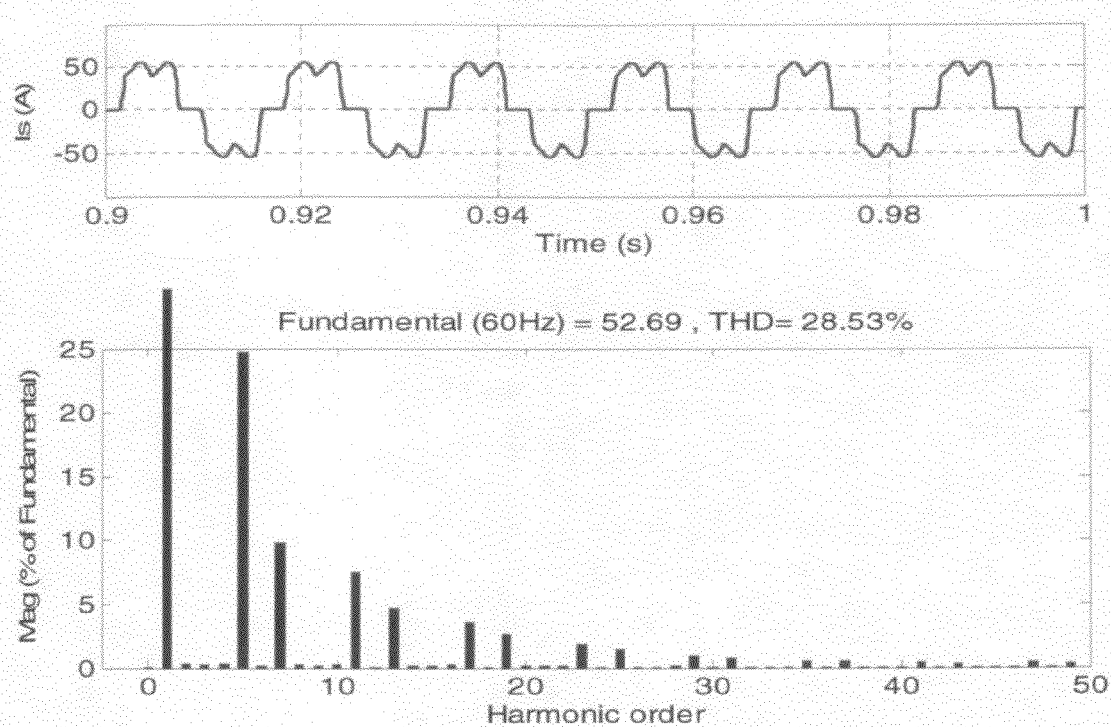

FIG. 13. Shows the Input current waveform of six-pulse ac-dc converter at light load and its harmonic spectrum. (50hp load)

Figure 14:
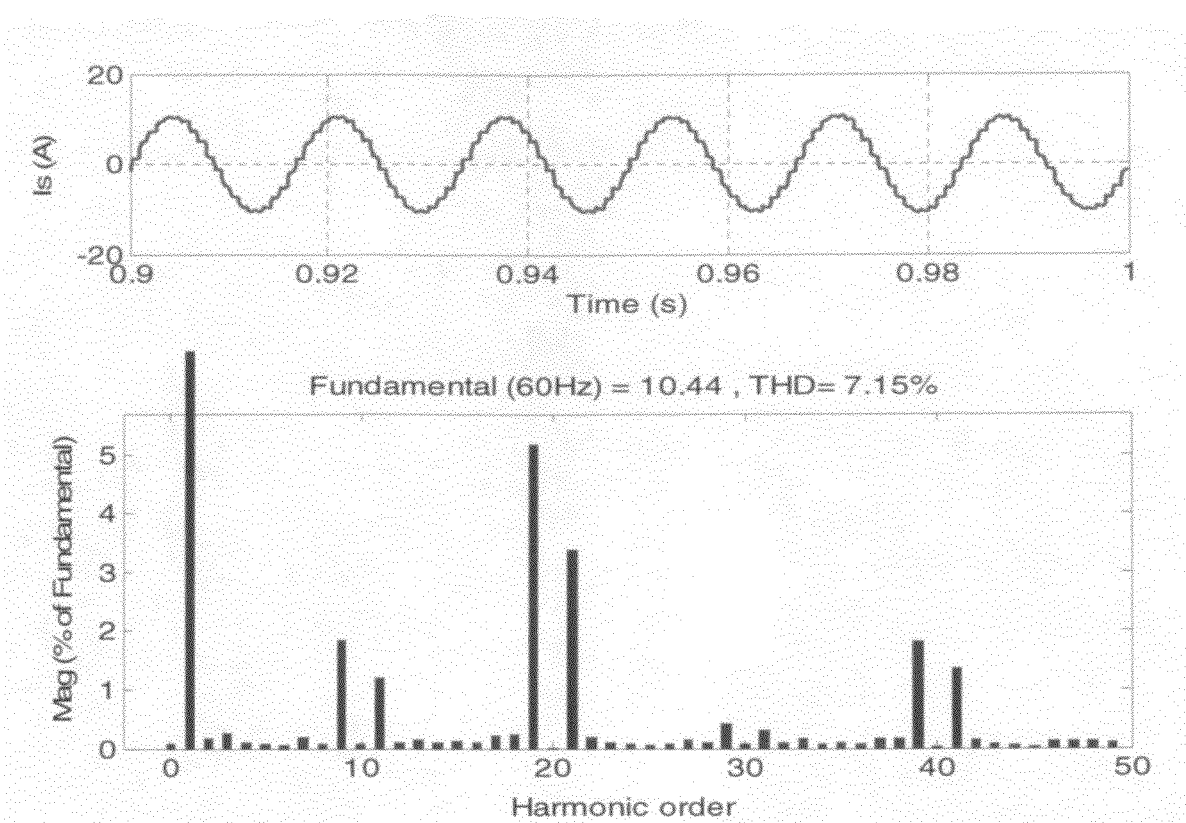

FIG. 14. Shows the Input current waveform of six-pulse ac-dc converter at full load and its harmonic spectrum. (50hp load)

Figure 15:
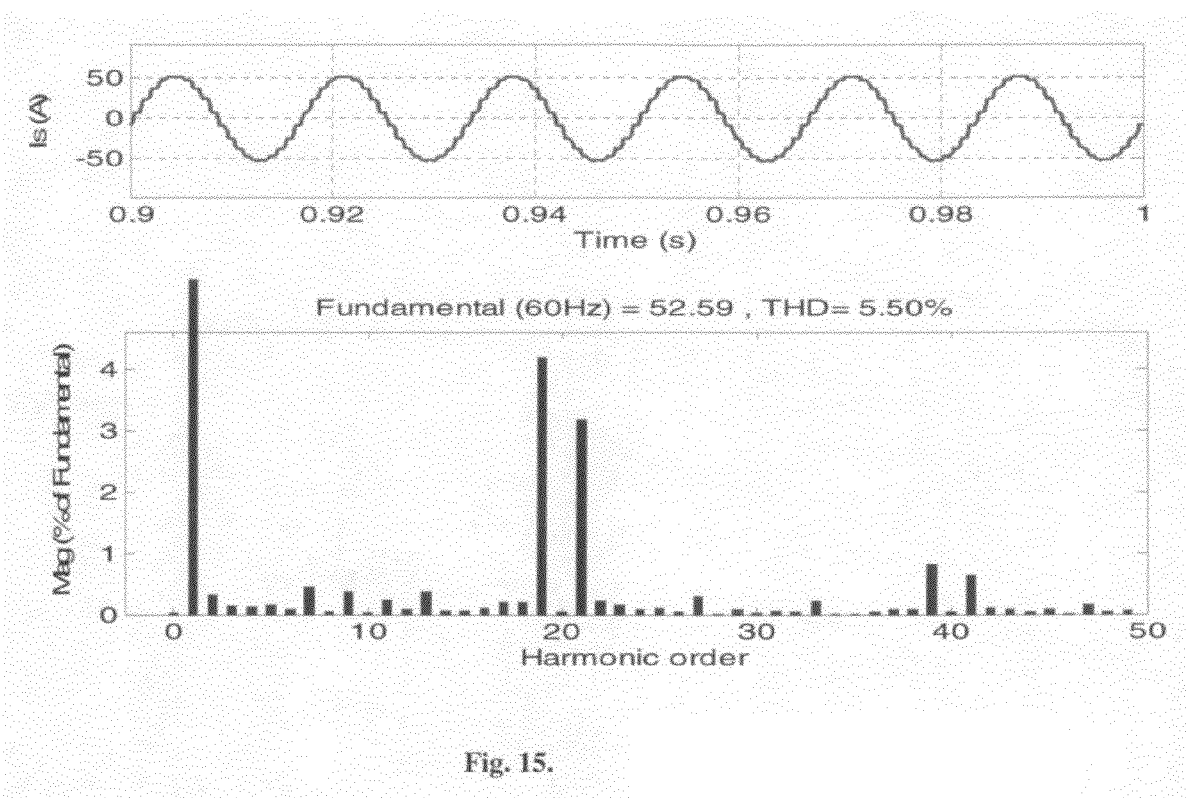

FIG. 15. Shows the Input current waveform of 20-pulse ac-dc converter at light load and its harmonic spectrum. (50hp load)

Figure 16:
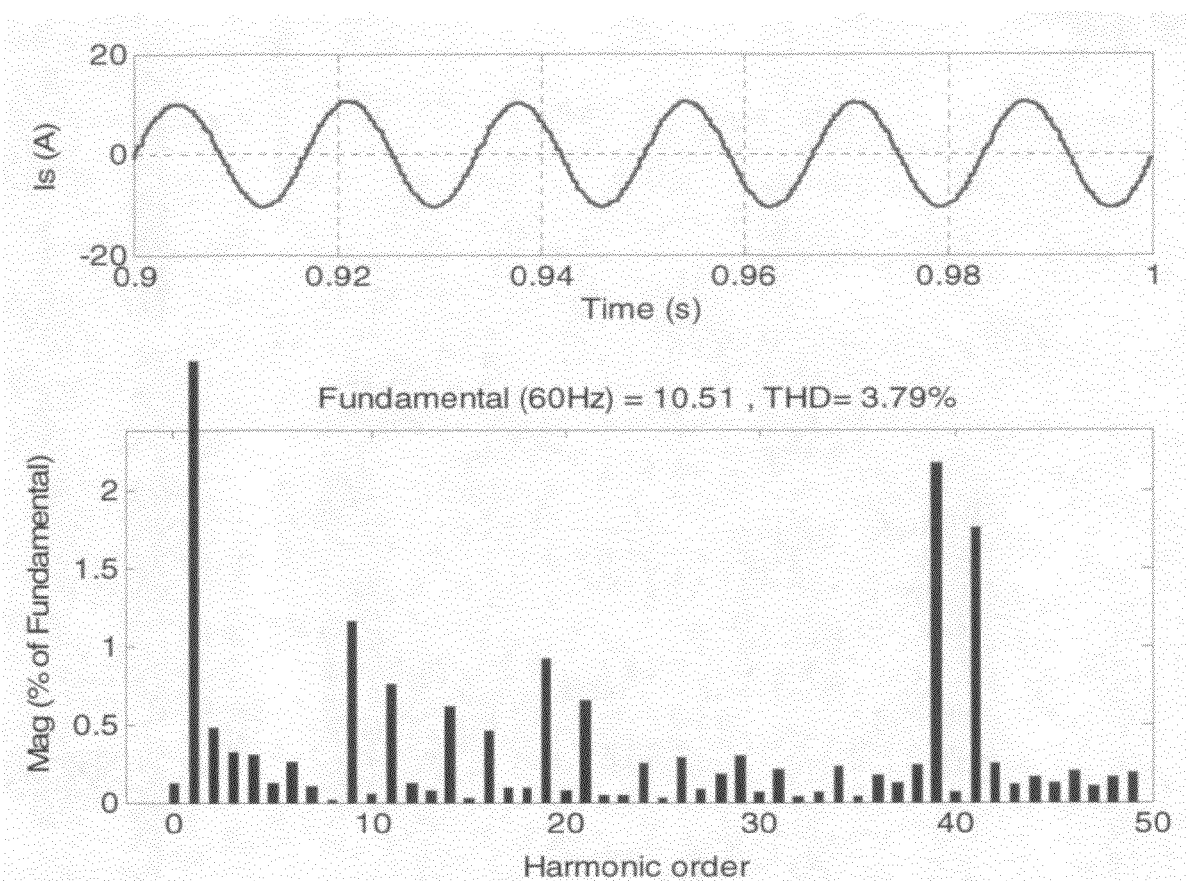

FIG. 16. Shows the Input current waveform of 20-pulse ac-dc converter at full load and its harmonic spectrum. (50hp load)

DETAILED DESCRIPTION OF THE INVENTION

MATLAB-BASED SIMULATIONS:

The designed configurations were simulated using Matlab/Simulink software and power system block set (PSB) toolbox. FIG. 7 shows the implemented a three-phase 460V and 60 Hz network is utilized as the supply for the 20and 40-pulse converters via the designed T-connected autotransformer which is modeled by two multi-winding transformers. Multi-winding transformer block is also used for modeling of ZSBT and tapped IPT.

At the converter output (dc link), a series inductance (L) and a parallel capacitor (C) are connected to feed the IGBT-based Voltage Source Inverter (VSI). VSI drives a squirrel cage induction motor employing direct torque controlled strategy. The simulated induction motor was 50 hp (37.3 kW), 4-pole, and Y-connected. Detailed data of the simulated motor are listed below:

Motor and Controller Specifications:

Three-phase squirrel cage induction motor-50 hp (37.3 kW), three phase, four pole, Y-connected, 460 V, 60 Hz. $R_s=0.0148\Omega$; $R_r=0.0092\Omega$; $X_{ls}=1.14\Omega$; $X_{lr}=1.14\Omega$, $X_{Lm}=3.94\Omega$, J=3.1 Kg•m².

Controller parameters: PI controller Kp=300; Ki=2000. DC link parameters: $L_d$=0.02 mH (0.001 pu); $C_d$=3200 μF (0.15 pu). Source impedance: $Z_s$ =j0.1884Ω(=0.03 pu). Autotransformer leakage inductance: $L_T$=0.0001 pu. ($X_{LT}$=0.04 pu).

RESULTS AND DISCUSSION:

Simulation results are depicted in FIGS. 8-16. FIG. 8 depicts two groups of five-phase voltage waveforms with a phase shift of 18 degrees between the same voltages of each group. Output voltage waveforms of the two parallel 10-pulse rectifiers with a phase difference of 18 degrees are shown in FIG. 9. The voltage across the tapped inter-phase transformer is shown in FIG. 10 which has a frequency 10 times that of the supply frequency. Diode $D_1$ conducts when the voltage across the tapped IPT is positive and, conversely, $D_2$ is on when the voltage across it is in its negative half-cycle. This conduction sequence of the diodes is the basis of the pulse doubling technique.

The current waveforms of pulse doubling diodes are shown in FIG. 11. The magneto-motive force (MMF) equivalence of the tapped IPT windings is formulated using equation (14). The 40-pulse converter output voltage (shown in FIG. 12) is almost smooth and free of ripples with average value of 607.5 V, which is approximately equal to the DC link voltage of a six-pulse rectifier (607.6 V). This makes the 40-pulse converter suitable for retrofit applications.

Input current waveforms and its harmonic spectrum of the 6-pulse, 20-pulse, and 40-pulse converters extracted and shown in FIGS. 13-16, respectively, to check their consistency with the limitations of the IEEE standard 519. These harmonic spectra are obtained when induction motor operates under light load (20% of full load) and full load conditions. The input current THD of the typical 6-pulse converter is equal to 28.53% and 52.53% for full load and light load conditions respectively, as illustrated in FIGS. 13 and 14.

TABLE I

COMPARISON OF POWER QUALITY PARAMETERS FOR DIFFERENT Simulated AC-DC Converters

| Sr. No. | Topology | % THD of $V_{ac}$ | AC Mains Current $I_{SA}$ (A) | | % THD of $I_{SA}$, at | | Distortion Factor, DF | | Displacement Factor, DPF | | Power Factor, PF | | DC Voltage (V) | |
|---|---|---|---|---|---|---|---|---|---|---|---|---|---|---|
| | | | Light Load | Full Load | Light Load | Full Load | Light Load | Full Load | Light Load | Full Load | Light Load | Full Load | Light Load | Full Load |
| 1 | 6-pulse | 5.63 | 10.33 | 52.69 | 52.53 | 28.53 | 0.884 | 0.959 | 0.985 | 0.988 | 0.872 | 0.948 | 616.6 | 607.6 |
| 2 | 20-pulse | 3.31 | 10.44 | 52.59 | 7.15 | 5.50 | 0.997 | 0.997 | 0.998 | 0.997 | 0.995 | 0.995 | 614.8 | 610.1 |
| 3 | 40-pulse | 2.57 | 10.51 | 52.59 | 3.79 | 2.55 | 0.999 | 0.999 | 0.999 | 0.999 | 0.998 | 0.998 | 610.5 | 607.5 |

As expected, these figures are relatively large which are not within the standard margins. The presence of low order harmonics is also one of the drawbacks of these types of converters. The current THD for the proposed 20-pulse converter is reduced to 5.50% and 7.15% for full load and light load conditions respectively as shown in FIGS. 15 and 16. These figures are still beyond the 5% limit set by IEEE standard. However, it can be seen that low order harmonics up to 17th are significantly eliminated in the supply current due to the proper operation of pulse multiplication. The use of proposed 40-pulse converter has resulted in an acceptable current THD of 3.79% for light load and 2.55% for full load conditions. In this configuration, low order harmonics up to 37th are further eliminated in the supply current. The efficiency of the proposed converter is calculated to be 98.6% in full load and 96.9% at light load.

In addition to the supply current THD, other power quality indices such as supply voltage THD, displacement power factor (DPF), distortion factor (DF), and power factor (PF) are also calculated under different loading conditions and shown in Table I. It can be seen that these indices are significantly improved as higher pulse number converters are utilized. Moreover, the mains power factor for the 40-pulse topology has reached unity from light load to full load conditions.

It is understood that the above description and drawings are illustrative of the present invention and that changes may be made in- as it is best known in the art without departing from the scope of the present invention as defined in the following claims.

TABLE II

RMS values of the voltage and current for windings of different transformers and their VA rating (eq 15) for 7.5 kW load

| Transformer | Rms values | W1 | W2 | W3 | W4 | W5 | W6 | W7 | W8 | W9 | W10 | W11 | W12 | VA rating |
|---|---|---|---|---|---|---|---|---|---|---|---|---|---|---|
| $T_{AN}$ | $V_{rms}$ (V) | 37.92 | 37.92 | 237.42 | 168.82 | 30.16 | 72.58 | 72.58 | 30.16 | 168.82 | 237.42 | 132.8 | 265.58 | 2929.15 |
|  | $I_{rms}$ (A) | 3.731 | 3.889 | 3.752 | 3.863 | 3.738 | 3.885 | 3.734 | 3.883 | 3.757 | 3.868 | 4.13 | 4.301 |  |
| $T_{BC}$ | $V_{rms}$ (V) | 36.02 | 36.02 | 24.61 | 2.3 | 67.02 | 125.35 | 125.35 | 67.02 | 2.3 | 24.61 | 460 |  | 1643.37 |
|  | $I_{rms}$ (A) | 3.731 | 3.889 | 3.752 | 3.863 | 3.738 | 3.885 | 3.734 | 3.883 | 3.757 | 3.868 | 2.916 |  |  |
| ZSBT | $V_{rms}$ (V) | 13.5 | 13.5 | 13.5 | 13.5 |  |  |  |  |  |  |  |  | 160 |
|  | $I_{rms}$ (A) | 5.93 | 5.93 | 5.93 | 5.93 |  |  |  |  |  |  |  |  |  |
| IPT | $V_{rms}$ (V) | 4.53 | 9.06 | 0.0783 |  |  |  |  |  |  |  |  |  | 40 |
|  | $I_{rms}$ (A) | 5.93 | 2.95 | 3.889 |  |  |  |  |  |  |  |  |  |  |

κVA RATINGS:

The kVA ratings of the T-connected autotransformer, tapped IPT, and ZSBT for 40-pulse configuration are calculated using the following equation:

$$\kappa VA = 0.5 \Sigma V_{winding} I_{winding} \qquad (15)$$

Where, $V_{winding}$ is the rms voltage across each part of the autotransformer, ZSBT and tapped IPT windings and $I_{winding}$ indicates the full load current of the same windings. These rms values are obtained from simulations with 10 hp (7.5 kW) load as tabulated and shown in Table II. The calculated ratings are 4572.5 VA, 160 VA and 40 VA for autotransformer ($T_{AN}$ and $T_{BC}$), ZSBT and tapped IPR respectively, which are 61.29%, 2.15% and 0.54% of the load power rating (7.5 kW) respectively. It means that the required magnetic ratings of the proposed topology is about 64% of the load rating while current THD of less than 5% is achieved.

In this invention a T-connected autotransformer was designed, modeled and simulated to investigate the operation of a 20-pulse ac-dc converter consisting of two paralleled 10-pulse five-phase rectifiers. The T-connected autotransformer makes use of only two single-phase transformers, resulting in reduced space, volume, weight, and cost of the ac-dc conversion system. Being capable for retrofit applications, the proposed design procedure was modified for this purpose. A zero-sequence-blocking transformer (ZSBT) was added to ensure the independent operation of paralleled rectifiers. A tapped inter-phase transformer was used to double the number of pulses in the ac mains currents. The increased number of pulses results in decreasing the size and volume of the transformers as well as improvement of the power quality indices at the pcc. Calculation of the kVA rating of the magnetic parts demonstrated savings in space, volume and cost of the proposed topology. Simulation results demonstrated the proper operation of the proposed configuration with good agreement within the limits set by IEEE-519. In summary, power quality improvement of the supply current/voltage and reduced ratings of the transformers and consequently reduced cost of the converter are the major benefits of the proposed 40-pulse ac-dc converter.

What I claim is:

1. A T-connected autotransformer based 40-pulse ac-dc converter for Power Quality Improvement, comprising: a 20-pulse ac-dc topology, comprising two parallel ten-pulse ac-dc converters, wherein each one of said ten-pulse ac-dc converters comprise a five-phase (five-leg) diode bridge rectifier.

2. The autotransformer of claim 1, wherein a zero sequence blocking transformer (ZSBT) operates said bridge diode rectifiers independently.

3. The autotransformer of claim 2, wherein a tapped inter-phase transformer is located at an output of said ZSBT, wherein said tapped transformer doubles voltage pulses of said output of ZSBT to 40.

4. The autotransformer of claim 3, wherein an average voltage output of said bridge are equal and phase shifted by 18 degrees.

5. The autotransformer of claim 4, wherein a voltage frequency of said ZSBT is five times higher than of a supply frequency and wherein said ZSBT comprises high impedance at zero sequence and multiple harmonics currents.

6. The autotransformer of claim 5, wherein said output of ZSBT is smooth and ripple free with average voltage value of 607.5 V, which is approximately equal to a DC link voltage of a six-pulse rectifier, therefore said autotransformer is suitable for retrofit applications.

7. The autotransformer of claim 6, wherein a κVA ratings of said autotransformer, said tapped inter-phase transformer and said ZSBT are calculated using the following equation: $\kappa VA = 0.5 \Sigma V_{winding} I_{winding}$; wherein $V_{winding}$ is an rms voltage across each part of said autotransformer, ZSBT and tapped inter-phase transformer windings, and $I_{winding}$ indicates a full load current of same said windings.

8. The autotransformer of claim 7, wherein said rms voltage are obtained from simulations with 10 hp (7.5 kW) load, and wherein calculated ratings are 4572.5 VA, 160 VA and 40 VA for said autotransformer, said ZSBT and said tapped inter-phase transformer respectively, and wherein said calculated ratings are 61.29%, 2.15% and 0.54% of a load power rating (7.5 kW) respectively.

9. The autotransformer of claim 8, wherein said autotransformer comprises only two single-phase transformers which is more economical in comparison with use of three single phase transformers.

10. The autotransformer of claim 9, wherein said topology is a 20-pulse converter and wherein use of pulse doubling technique with a low rating; 2% of said load power results in increased number of pulses to 40.

11. The autotransformer of claim 10, wherein said autotransformer comprises retrofit applications replacing 6-pulse converters with common applications requiring improved power quality indices at a mains (input current THD of less that 5% in most loading conditions).

* * * * *